March 14, 1961     M. E. WALBERG     2,974,738
LOCKING AND BALANCING FOLDING IMPLEMENT FRAME
Filed Oct. 22, 1958     2 Sheets-Sheet 1

Inventor
Maynard E. Walberg
By Howard B. Scheckman
Attorney

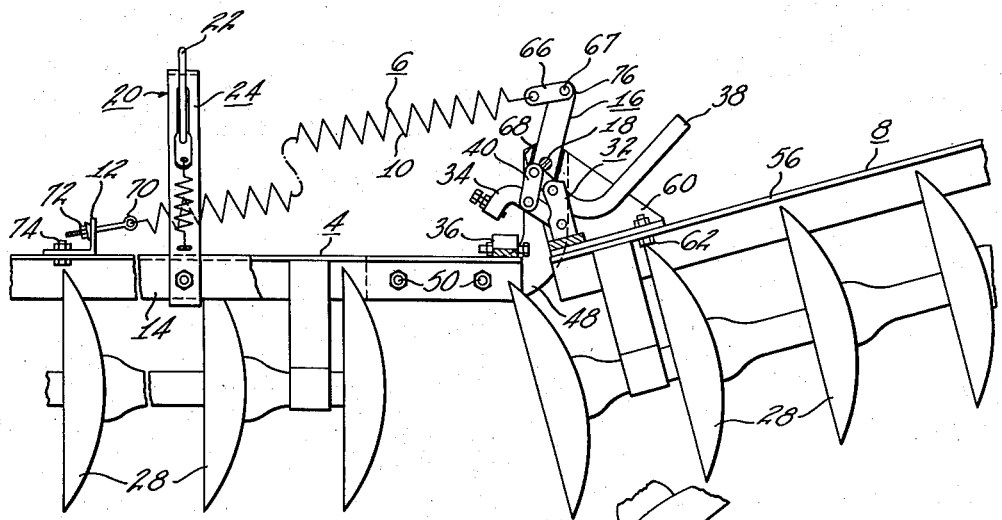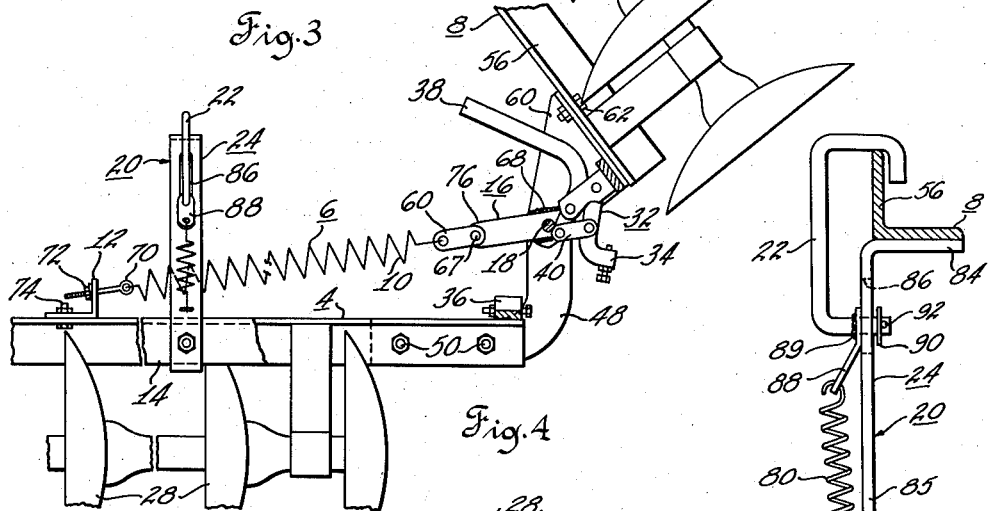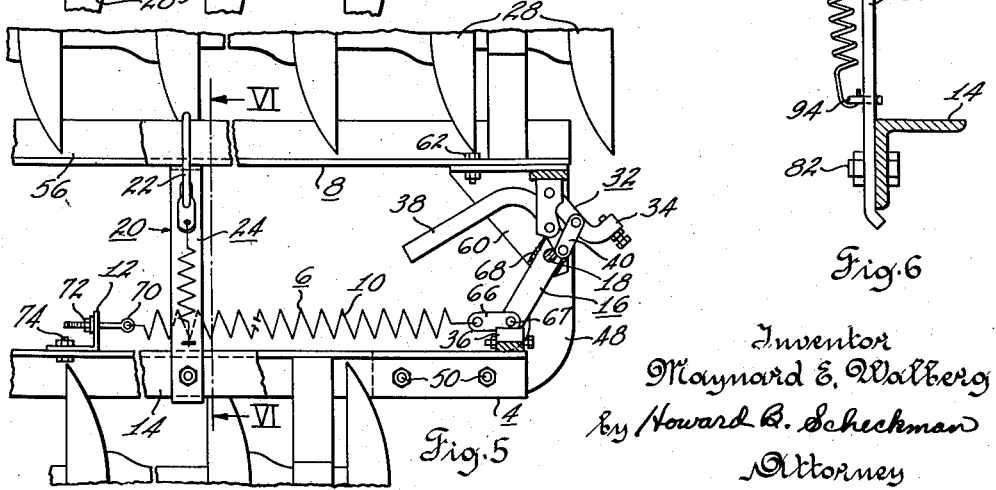

United States Patent Office 2,974,738
Patented Mar. 14, 1961

2,974,738
LOCKING AND BALANCING FOLDING IMPLEMENT FRAME

Maynard E. Walberg, West Salem, Wis., assignor to Allis-Chalmers Manufacturing Company, Milwaukee, Wis.

Filed Oct. 22, 1958, Ser. No. 768,998

8 Claims. (Cl. 172—568)

This invention relates to agricultural implements and more particularly to an improved folding frame construction for such implements.

As tractors become more powerful, they can move larger farm implements. However, as the width of the farm implement increases, so does the difficulty in transporting and storing the implement. A solution to this difficulty is the folding implement frame; that is, an implement frame made with pivoted end sections which can be folded back onto a center section. Folding decreases the width of the frame. This permits the frame to pass where it normally could not, for example, through narrow driveways, gates and into storage areas in buildings.

Folding implement frames are not new. See for example U.S. Patents 1,089,927 and 1,308,938. However, there are certain problems in prior art folding implement frames.

One problem is that the folding end section is very heavy and carries implements which contain sharp cutting edges. This makes it difficult and dangerous to move the end section. If the heavy end section should slip when being moved to its open or folded position, it can severely injure or maim the operator.

Another problem is that, once the end section has been folded it must be kept folded to prevent it from accidentally opening up. This is particularly a problem where the ground is hard and the implement is used with the end sections folded so that they add weight to the remaining ground engaging tools to get cutting penetration.

It is an object of this invention to provide a counterbalancing arrangement for the end section of a folding implement frame that permits the end section to be easily and safely moved between its open and folded positions with a minimum of effort and time.

It is another object of this invention to provide a quickly actuated hold-down arrangement which will secure the end section in its folded position.

Other objects and advantages will appear from the following description considered in conjunction with the attached drawings, in which:

Fig. 3 is a view showing the end section in a first neutral position;

Fig. 4 is a view like Fig. 3 but with the end section in a second neutral position;

Fig. 5 is a view similar to Fig. 4 with the end section in its folded position;

Fig. 6 is a section view of Fig. 5 taken in the direction of arrows VI—VI showing the hold-down arrangement that holds the end section in its folded position.

*In general*

Figures 1, 2:
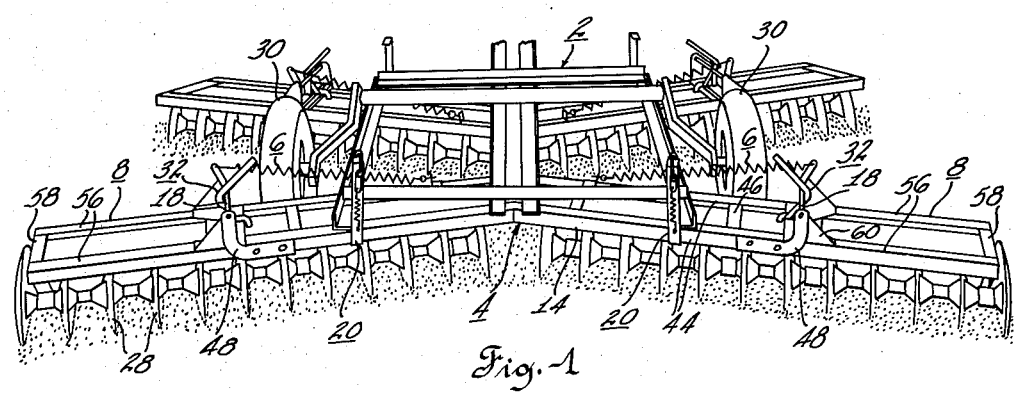
Fig. 1 is a view of a disk harrow employing the implement frame of this invention, the implement frame shown in open position with the end sections rigidly connected to the center section of the frame.
Fig. 2 is a view of the disk harrow of Fig. 1 passing through a gate, with the end sections of the frame folded back onto the center section and the harrow disks raised to transport position.

Generally this invention comprises: providing farm implement 2 (Fig. 1), having a folding implement frame 4, with counterbalancing arrangement 6, to counterbalance the weight of end sections 8 of frame 4.

The counterbalancing arrangement includes resilient means in the form of spring 10 (Fig. 4) which is connected to anchor 12 fixed to center section 14 and to arm 16 fixed to end section 8. Arm 16 is positioned so that it rotates about pivot 18 which is the pivot point of end and center sections 8, 14. Arm 16 and spring 10 counterbalance the weight of end section 8 to help the operator move the end section between open and folded positions. The arm and spring also operate to counterbalance the weight of the end section when it reaches these positions. The operator thus has the end section under control at all times.

To maintain the end section in its folded position, hold-down arrangement 20 (Fig. 6) in the form of a spring biased clamp 22 is provided. Clamp 22 holds end section 8 against prop 24 to prevent accidental release of the end section.

Connecting arrangement 6 for each end section 8 is a right and left hand duplicate. Therefore, only one of said connections, the right hand one, will be described.

*Invention specifically*

Referring more specifically to Fig. 1 the invention is shown applied to a farm implement 2 in the form of a harrow. The harrow includes a folding implement frame 4 having end sections 8 and a center section 14. Each end section 8 is pivotally connected by pivot 18 to center section 14. The end sections are shown in their open position. In this position the end sections are fully opened and locked in position. Implements, such as harrow disks 28, are carried by implement frame 4. The harrow disks are raised and lowered relative to the ground by transport wheels 30.

The end and center sections (Fig. 1) are rigidly locked together against the urging of spring 10 by a lock means 32. See my copending U.S. patent application 768,980.

The lock means includes a pivotally supported latch bar 34 carried by the end section to engage a support 36 carried by the center section, and a toggle arrangement including a lever 38 and link 40 to hold the latch bar locked to prevent accidental disengagement.

Referring to Fig. 2, the harrow is shown in its folded position. When it is desired to move the harrow through a narrow opening, as gate 42 for example, transport wheels 30 are lowered. This raises disks 28 and permits end sections 8 to be folded back onto center section 14.

Referring to Fig. 1, center section 14 is made up of spaced side members 44 which may be angle irons, and cross members 46 to brace said side members.

Connected to the end of each side member 44 of the center section, is a bracket 48 which serves as a hinge strap. Each bracket is rigidly secured to a side member, as by bolts 50. Each bracket has an end which is curved upwardly and contains an opening 52 (Fig. 2). Openings 52 in brackets 48 are aligned, and receive a horizontal pivot rod 18.

End section 8 of the frame is rectangular and has side members 56 which may be angle irons, and cross members 58 to brace said side members.

Connected to the top surface at the end of each side member of the end section, is an angle bracket 60 which serves as a hinge strap. Angle brackets 60 are rigidly secured to the top of the side members 56, as by bolts 62. Each angle bracket has a vertical portion which is provided with openings which align with openings 52 (Fig. 2) in brackets 48, and also receive pivot rod 18.

The axis of pivot rod 18 is spaced vertically above side members 44, 56 when end section 8 is in the open position.

When end sections 8 are in open position (Fig. 1) angle brackets 60 fit within curved brackets 48. This strengthens the connection and makes it better able to transmit the draft forces.

To counterbalance the weight of end section 8, there is provided an elongated resilient means in the form of a tension spring 10 whose displacement is along its longitudinal axis, and arm 16.

The spring interconnects end section 8 and center section 14. One end of spring 10 is adjustably connected through link 66 to arm 16. The arm 16 is in turn rigidly secured, as by welds 68, to angle bracket 60 fastened to end section 8. Link 66 is pivotally secured to arm 16 by means of pivot 67. This is so arm 16 and spring 10 pivot about pivot 67 and not about the end of the spring, which might damage the spring end. The other end of spring 10 is adjustably connected to the center section of the frame 14 by means in the form of an eye bolt 70. Eye bolt 70 has a threaded end which is received in anchor 12 and secured by means of nut 72. Anchor 10 is connected to center frame 14 by means of bolt 74.

The tension of spring 10 can be adjusted by rotating nut 72 to balance the weight of the end section. This enables said section to be readily and easily pivoted between its open position and its folded position.

Arm 16 has a free end 76 that is normal to the axis of pivot 18. The free end of the arm extends from end section 8 to a position vertically above pivot 18 when sections 8, 14 are in the open position. When sections 8, 14 are in the folded position (Fig. 5), free end 76 is positioned vertically below pivot 18. The effect of movement of free end 76 of arm 16 from one side (Fig. 3) of pivot 18 to the other side of pivotal connection 18 (Fig. 5) is to move the axis of elongated resilient means 10, past a position (Fig. 4) where said axis of said resilient means extends normal to the axis of said pivotal connection 18, so as to move the line of action of said resilient means over center. This results in spring 10 urging end section 8 toward the open position when the end section is folded, and toward the folded position when the end section is open.

When pivoting the end section from the folded position, clockwise to the open position, spring 10 balances the weight of the end section and prevents it from falling to the ground which would be dangerous to the operator.

When pivoting the end section from the open position (Fig. 1) counterclockwise to the folded position (Fig. 2), the spring balances the weight of the end section and prevents it from falling into the folded position.

It is noted that spring 10 does not hold end section 8 in the open or folded positions. This would actually make it more difficult to move the end section from one position to the other. The spring tries to move the end section from these positions so that it will aid the operator in moving the end section.

Due to spring 10 urging the end section out of its folded position it is necessary to provide a hold-down arrangement 20 (Fig. 6) to prevent accidental release of end section 8 while moving the harrow.

Hold-down arrangement 20 (Fig. 6) comprises prop 24, clamp 22 and bias means 80 in the form of a spring to pull the clamp toward the prop.

The prop is rigidly secured, as by bolt 82, to center section 14. The upper end of prop 24 has a flange portion 84 at right angles to vertical portion 85. End section 8 rests on flange 84 when in its folded position.

Clamp 22 is C-shaped. The lower end of clamp 22 is slidably received in slot 86 in vertical portion 85 of prop 24. The lower end of clamp 22 is maintained in the vertical portion by a connecting strap 88 and washer 90. Connecting strap 88 is rigidly secured, as by welding 89, to the lower end of the clamp on one side of the vertical portion of prop 24. Washer 90 is secured by a cotter pin 92 to the lower end of the clamp on the other side of the vertical portion. The strap and washer are both spaced to provide the clamp with clearance so the clamp can be rocked to engage or disengage with end section 8.

The clamp is urged to its clamping position by tension spring 80. Spring 80 is connected at one end to strap 88 on the clamp, and its other end is connected to a cotter pin 94 fastened to the lower end of vertical portion 85. Spring 80 is made strong enough to overcome the force spring 10 exerts on end section 8 in the folded position, to hold end section 8 against flange 84.

Operation

Assuming that end section 8 is in its folded position as indicated in Fig. 5 and is to be moved to its open position indicated in Fig. 1.

First, clamp 22 (Fig. 6) is raised and rocked to free end section 8. When the clamp is released, spring 10 and arm 16 cooperate to automatically move end section 8 to the neutral position shown in Fig. 4. In this position spring 10 just balances the weight of the end section.

Since the weight of the end section is balanced in the position shown in Fig. 4, it doesn't require much force to pivot the end section clockwise to move the end section toward its open position. As the end section is moved, it reaches a position shown in Fig. 3 wherein the weight of the end section is once again balanced by spring 10 and arm 16, the arm having rotated around pivot 18 to a position above the pivot.

In the position shown in Fig. 3, spring 10 now opposes clockwise movement of end section 8 so there is no danger of the end section falling and injuring the operator. The operator has only then to apply force to the end section to pivot it against the action of spring 10, to move the end section into its open position. Once the end section is in the open position, lever 38 is rotated to lock the two sections rigidly together.

To move the end section from its open to its folded position, it is only necessary to reverse the above procedure.

In summary

This invention provides an implement frame having a counterbalancing arrangement that permits an operator to easily move the folding end sections between the open and folded position.

This invention also provides a quickly actuated hold-down arrangement that secures the end section in its folded position to prevent accidental disengagement between the end and center section.

It is noted that, although this invention is illustrated as applied to the implement frame of a harrow, it can be applied to other farm implements using folding implement frames, as for example, cultivators.

Although but a single embodiment of the present invention has been illustrated and described, it will be apparent to one skilled in the art that various changes and modifications may be made therein without departing from the invention as defined in the appended claims.

What is claimed is:

1. In a folding agricultural implement frame, the combination comprising: first and second sections pivotally connected and relatively movable between an open position and a folded position; an arm; means fixedly connecting said arm to said second section, the free end of said arm positioned above said pivotal connection of said first and second sections when said sections are in said open position; said second section positioning said free end of said arm below said pivotal connection when said sections are in said folded position; elongated resilient means; said resilient means having a longitudinal axis, the displacement of said resilient means being along its longitudinal axis; means connecting said resilient means to said first section; means connecting said resilient means to said free end of said arm, said free end of said arm, when moving from one side to the other side of said pivotal connection, moving said axis of said resilient means past a position where said axis of said resilient means extends normal to the axis of said pivotal connection; said resilient means urging said sections toward said open position when said sections are in said folded position, and toward said folded position when said sections are in said open position; and, said second section being provided with locking means that cooperates with said first section to maintain said second section in open position against the urging of said resilient means.

2. A device as set forth in claim 1, wherein said resilient means is a spring, and said means connecting said resilient means to said first section includes means to vary the tension of said spring.

3. A device as set forth in claim 2, wherein said means connecting said resilient means to said arm includes a link connected at one end to said spring; and, means pivotally connecting the other end of said link to said arm, said arm pivoting relative to said link as said arm is moved between said open and folded positions by said second end section.

4. A device as set forth in claim 1 wherein said first section is provided with a hold down arrangement to maintain said second section in its folded position against the urging of said resilient means.

5. In combination with a harrow having a folding implement frame with a heavy end section pivotally connected to a center section for movement between an open and folded position, a balancing arrangement for aiding in moving said end section between said open and folded positions, including: an arm; means fixedly connecting said arm to said end section with the free end of said arm positioned above said pivotal connection of said sections when said sections are in said open position; said end section moving said free end of said arm below said pivotal connection when said sections are in the folded position, said arm extending in a direction normal to the axis of said pivotal connection; resilient means; means connecting said resilient means to said center section; means connecting said resilient means to the free end of said arm; said resilient means urging said sections toward said open position when said sections are folded, and toward said folded position when said sections are in the open position; a hold-down arrangement; means connecting said hold-down arrangement to said end section, said hold-down arrangement maintaining said end section in its folded position against the urging of said resilient means; and, locking means carried by said end section and cooperating with said center section to maintain said end section in its open position against the urging of said resilient means.

6. In combination with a harrow having a folding implement frame with a heavy end section pivotally connected to a center section for movement between an open and folded position, a balancing arrangement for aiding in moving said end section between said open and folded positions; including: an arm; means fixedly connecting said arm to said end section with the free end of said arm positioned above said pivotal connection of said two sections when said sections are in said open position and below said pivotal connection when said sections are in said folded position, said arm extending in a direction normal to the axis of said pivotal connection; an anchor; means connecting said anchor to said center section; a spring; means adjustably connecting one end of said spring to said anchor; a link having one end connected to the other end of said spring; means pivotally connecting said link to said arm; said spring urging said sections toward said open position when said sections are folded and toward said folded position when said sections are in said open position; a prop having a vertical portion and a flange portion normal to said vertical portion; means connecting said vertical portion to said center section, said flange portion serving as a rest for said end section when said end section is in said folded position; a clamp; means movably connecting said clamp to said vertical portion for limited sliding and rocking movement, said clamp being movable so it can be moved to a position to engage and disengage said clamp with said end section; bias means; means connecting said bias means to said clamp; means connecting said bias means to said vertical portion of said prop, said bias means urging said clamp toward said flange portion to securely hold said end section in said folded position between said clamp and said flange portion against the urging of said spring; and, locking means carried by said end section and cooperating with said center section to rigidly lock said sections together against the urging of said spring when said end section is in said open position.

7. In a folding implement frame, the combination comprising: first and second sections pivotally connected and relatively movable between an open position and a folded position; an arm; means fixedly connecting said arm to said second section, the free end of said arm positioned above said pivotal connection of said first and second sections when said sections are in said open position; said second section positioning said free end of said arm below said pivotal connection when said sections are in said folded position; resilient means; means connecting said resilient means to said first section; means connecting said resilient means to said free end of said arm, said resilient means urging said sections toward said open position when said sections are in said folded position, and toward said folded position when said sections are in said open position; a prop having a vertical portion and a flange portion; means connecting said vertical portion to said first section, said flange portion serving as a rest for said second section when it is in said folded position; a clamp; means connecting said clamp to said vertical portion for limited sliding and rocking movement to engage and disengage said clamp with said second section; bias means; means connecting said bias means to said clamp; and, means connecting said bias means to said vertical portion of said prop, said bias means urging said clamp toward said flange portion to securely hold said second section between said clamp and said flange portion.

8. In a folding agricultural implement frame, the combination comprising: first and second sections pivotally connected and relatively movable between an open position and a folded position; an arm; means fixedly connecting said arm to said second section, the free end of said arm being positioned on one side of said pivotal connection of said first and second sections when said sections are in said open position; said second section positioning said free end of said arm on the other side of said pivotal connection when said sections are in said folded position; elongated resilient means; said resilient means having a longitudinal axis, the displacement of said resilient means being along its longitudinal axis; means connecting said resilient means to said first section; means connecting said resilient means to said free end of said arm, said free end of said arm, when moving from one side to the other side of said pivotal connection, moving said axis of said resilient means past a position where said axis of said resilient means extends normal to the axis of said pivotal connection; said resilient means urging said sections toward said open position when said sections are in said folded position, and toward said folded position when said sections are in said open position; and, said second section being provided with locking means that cooperates with said first section to maintain said second section in open position against the urging of said resilient means.

(References on following page)

References Cited in the file of this patent

UNITED STATES PATENTS

| | | | |
|---|---|---|---|
| 820,887 | McGuire | May 15, | 1906 |
| 928,046 | Hari | July 13, | 1909 |
| 1,072,863 | Lee | Sept. 9, | 1913 |
| 1,404,544 | Rettig | Jan. 24, | 1922 |
| 2,498,888 | Hyland et al. | Feb. 28, | 1950 |
| 2,549,266 | Troden et al. | Apr. 17, | 1951 |
| 2,736,252 | Latshaw | Feb. 28, | 1956 |
| 2,737,766 | Garner | Mar. 13, | 1956 |
| 2,771,629 | Gessler | Nov. 27, | 1956 |